(12) United States Patent
Park et al.

(10) Patent No.: US 8,141,483 B2
(45) Date of Patent: Mar. 27, 2012

(54) PRINTING PLATE AND METHOD OF PRINTING AN ALIGNMENT FILM USING THE SAME

(75) Inventors: Jaehyun Park, Osan-si (KR); Byungho Moon, Seoul (KR)

(73) Assignee: LG. Display Co. Ltd., Seoul (KR)

( * ) Notice: Subject to any disclaimer, the term of this patent is extended or adjusted under 35 U.S.C. 154(b) by 550 days.

(21) Appl. No.: 12/339,953

(22) Filed: Dec. 19, 2008

(65) Prior Publication Data
US 2010/0043654 A1 Feb. 25, 2010

(30) Foreign Application Priority Data
Aug. 25, 2008 (KR) .......................... 10-2008-0082836

(51) Int. Cl.
*B31F 19/02* (2006.01)
(52) U.S. Cl. ........................................... 101/23; 101/32
(58) Field of Classification Search .................. 101/23
See application file for complete search history.

(56) References Cited

U.S. PATENT DOCUMENTS

| | | | | |
|---|---|---|---|---|
| 5,678,483 A * | 10/1997 | Johnson | ........................ | 101/153 |
| 5,678,783 A * | 10/1997 | Wong | ............................ | 244/1 R |
| 6,321,571 B1 * | 11/2001 | Themont et al. | ................ | 65/155 |
| 7,132,792 B2 * | 11/2006 | Bae | ................................ | 313/509 |
| 7,243,601 B2 * | 7/2007 | Morimoto et al. | ............ | 101/401 |
| 2005/0126410 A1 * | 6/2005 | Won et al. | ..................... | 101/359 |
| 2006/0187400 A1 * | 8/2006 | Chae et al. | .................... | 349/155 |
| 2007/0153214 A1 * | 7/2007 | Park et al. | ..................... | 349/155 |
| 2007/0236645 A1 * | 10/2007 | Hashimoto | ................... | 349/155 |

FOREIGN PATENT DOCUMENTS

| | | |
|---|---|---|
| JP | 3038374 A | 2/1991 |
| JP | 4240819 A | 8/1992 |
| JP | 9274310 A | 10/1997 |
| JP | 2000006369 A | 1/2000 |
| JP | 2002-301803 A | 10/2002 |
| JP | 2004-276388 | 10/2004 |
| KR | 10-2006-0016667 | 8/2004 |

OTHER PUBLICATIONS

Office Action issued in corresponding Korean Patent Application No. 10-2008-0082836; issued Sep. 25, 2009.
Office Action issued in corresponding Japanese Patent Application No. 2008-317929, mailed Oct. 5, 2011.

* cited by examiner

*Primary Examiner* — Anthony Nguyen
(74) *Attorney, Agent, or Firm* — Brinks Hofer Gilson & Lione (57) ABSTRACT

The present disclosure relates to the device and the method for printing an alignment film. The printing plate comprises: a resin plate; a plurality of pixel array embossing pattern formed on the resin plate, for printing the alignment film to a pixel array formed on the glass substrate of the liquid crystal display device; a plurality of dummy embossing pattern formed on the resin plate at which the pixel array embossing patterns are not formed as seeing in the rotating direction of the printing roller; and a grooved pattern formed on the resin plate between the pixel array embossing patterns and between the dummy embossing patterns.

13 Claims, 8 Drawing Sheets

FIG. 1

(RELATED ART)

FIG. 2

(RELATED ART)

FIG. 3

(RELATED ART)

(RELATED ART)

PRINTING PLATE AND METHOD OF PRINTING AN ALIGNMENT FILM USING THE SAME

RELATED APPLICATIONS

This application claims the benefit of Korea Patent Application No. 10-2008-0082836 filed on Aug. 25, 2008, which is incorporated herein by reference for all purposes as if fully set forth herein.

BACKGROUND

1. Field of the Invention

The present disclosure relates to the device and the method for printing an alignment film. Particularly, the present disclosure relates to the printing plate and the method for printing an alignment film thereof.

2. Discussion of the Related Art

The active matrix type liquid crystal display device (or "LCD device") represents video data using a thin film transistor (or "TFT") as a switching element. The liquid crystal display device is smaller than the cathode ray tube (or "CRT") so that is is easily applied as the display device for portable information device, office automation device, computer and so on. Furthermore, it is rapidly applied as the television display replacing the CRT.

Figure 1:
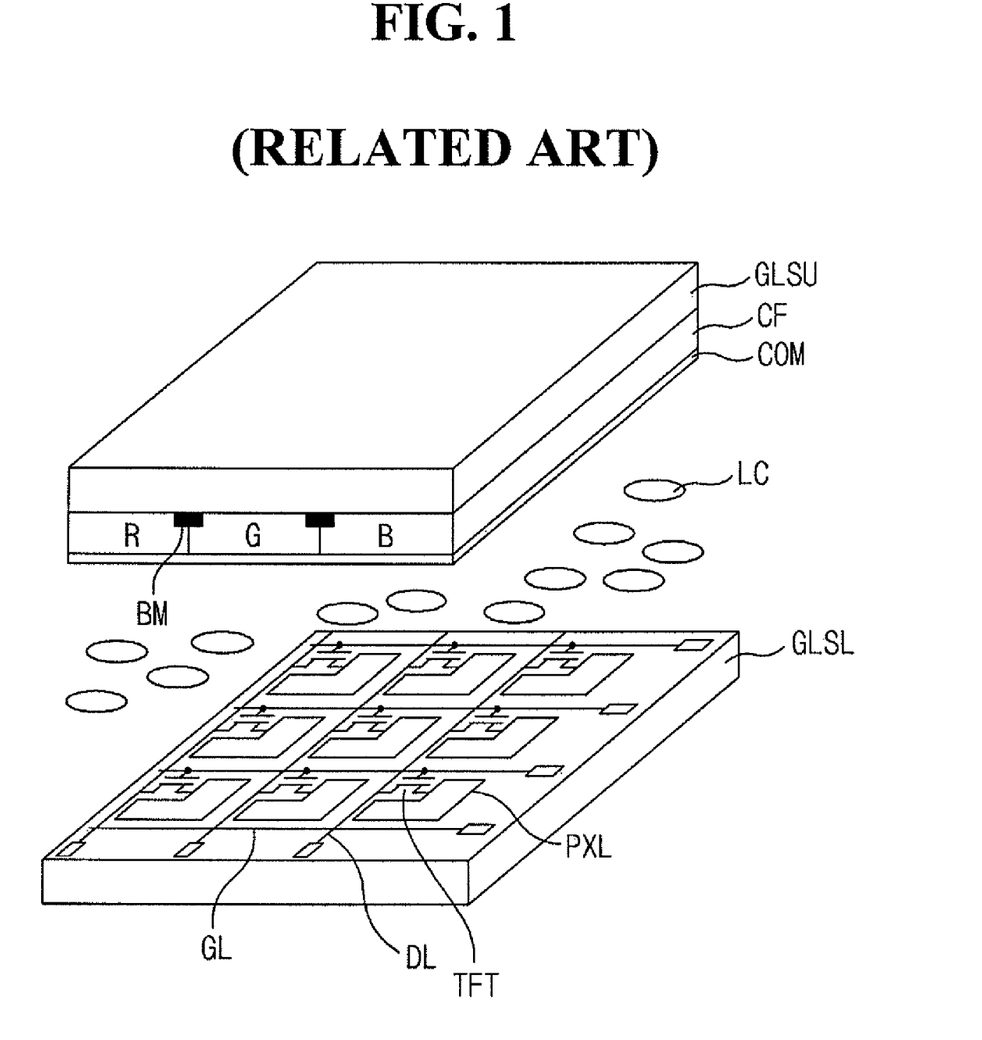
FIG. 1 is a diagram illustrating the structure of a pixel array of the active matrix liquid crystal display device.

FIG. 1 illustrates some portions of the pixel array in the active matrix liquid crystal display device.

Referring to FIG. 1, on the lower glass substrate of the liquid crystal display device (GLSL) a TFT array is formed, and on the upper glass substrate of the LCD device (GLSU) a color filter array is formed. The TFT array on the lower glass substrate (GLSL) includes the data lines (DL) and the gate lines (GL) crosswisely disposed each other, and the TFTs formed at each crossed portions of the data lines and gate lines, and the pixel electrodes connected to each TFTs. The color filter array of the upper glass substrate (GLSU) includes a black matrix (BM), a color filter (CF) and a common electrode (COM).

On the light incident surface of the lower glass substrate (GLSL), a lower polarization plate is attached, and on the light outgoing surface of the upper glass substrate (GLSU) a upper polarization plate is attached. The light absorbing axis of the lower polarization plate and the upper polarization plate are perpendicularly crossed. In addition, alignment films are formed on the inner surfaces of the lower glass substrate (GLSL) and the upper glass substrate (GLSU) with which the liquid crystal layer (LC) is contacted.

As it is difficult to get a desired aligning condition of the liquid crystal material molecules just by injecting the liquid crystal material between the glass substrates, the alignment films should be formed in the LCD device to set pre-tilt angle of the liquid crystal molecules.

Figure 2:
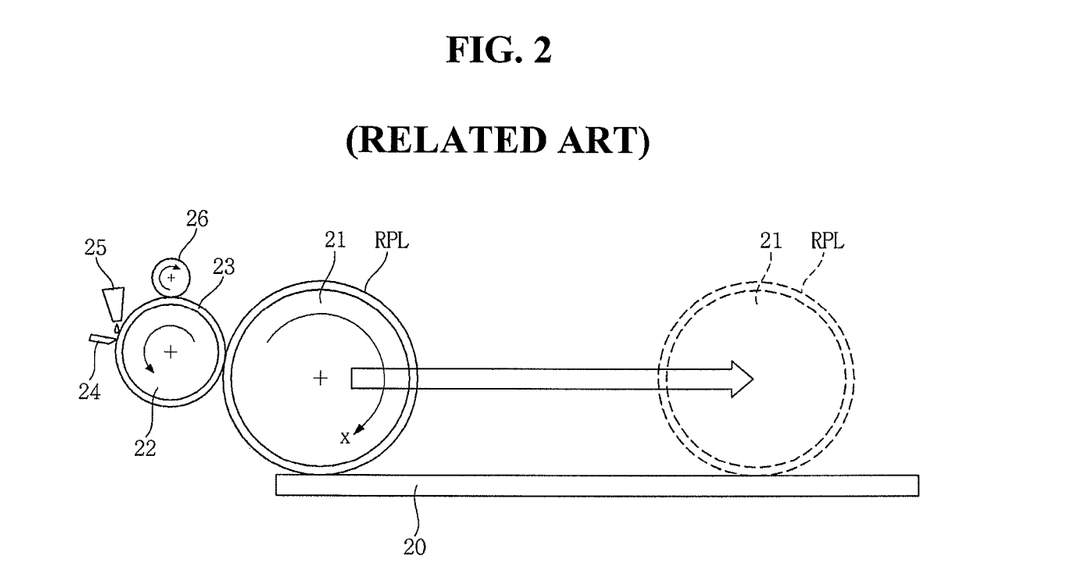
FIG. 2 is a cross sectional view illustrating the alignment film printing device.

As shown in FIG. 2, the device for printing an alignment film includes a printing roller 21 around which printing plate (RPL) is rolled, an anilox roller 22, a doctor blade 24, a dispenser 25, and a doctor roller 26.

The printing roller 21 contacts the anilox roller 22 so that it is supplied with alignment film material 23 from the anilox roller 22. For the alignment film material 23, generally a polyimide is selected. At one side of the printing roller 21, a pinion gear is engaged and a rack gear is engaged with the pinion gear. The printing roller 21 interlocks with the pinion gear and the rack gear so that it rolls and moves linearly along the arrow line direction and then it transcribes the alignment film material 23 coated on the printing plate (RPL) to the glass substrate 20 of the LCD device. While the printing roller 21 transcribes the alignment film material on the glass substrate 20 of the LCD device, the glass substrate 20 is attached to the stage by a vacuum force.

The alignment film material 23 is supplied to the anilox roller 22. By rotating the anilox roller 22 and the printing roller 21 in opposite directions to each other, the alignment film material 23 coated on the anilox roller 22 is transcribed to the printing roller 21.

The doctor blade 24 shaves off the alignment film material 23 supplied to the anliox roller 22 by the dispenser 25. In order to make uniformly the thickness of the alignment film material coated on the anilox roller 22, the alignment film printing device shown in FIG. 2, includes the doctor roller 26. The doctor roller 26, as disposed as close to the anilox roller 22, presses the alignment film material 23 coated on the anilox roller 22, and rotates to opposite direction to the anilox roller 22 to make the thickness of the alignment film material 23 uniform.

Due to the dummy relief (or embossing) pattern of the printing plate (RPL) rolled around the printing roller 21, when the printing roller 21 and the anilox roller 22 are rotating, periodically an impact force is applied to the anilox roller 22. The impact force may cause a gap between the anilox roller 22 and doctor blade 24 and vary the pressing amount of the doctor roller 26 to the anilox roller 22. Therefore, the thickness of the alignment film material coated on the printed plate (RPL) may be varied (not uniform). In this case, the alignment of the liquid crystal molecules becomes irregular and the cell gap becomes uneven. This causes a defect on the display panel.

Figure 3:
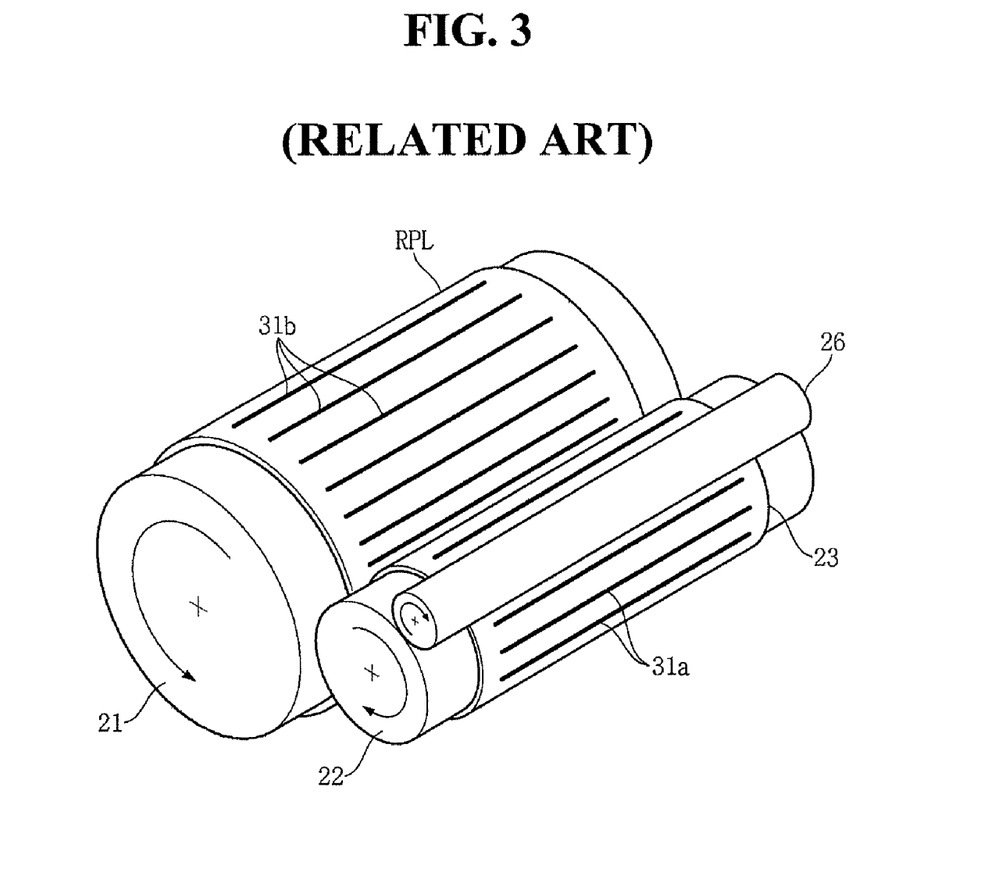
FIG. 3 is a perspective view illustrating a dragging trace of the doctor roller in the alignment film printing device shown in the FIG. 2.

In more detail, every time when the impact force due to the level difference of dummy relief (embossing) pattern formed on the printing plate (RPL) is applied to the anilox roller 22, the pressing force of the doctor roller 26 to the anilox roller 22 is excessively increased. As a result, the doctor roller 26 does not rotate while being contacted to the anilox roller 22 but is dragged on the anilox roller 22. As shown in FIG. 3, the dragging trace 31a of the doctor roller 26 formed on the alignment film material 23 coated on the anilox roller 22 is also transcribed to the printing plate (RPL) rotating by interlocking with the anilox roller 22. The dragging trace 31b of the doctor roller 26 transcribed on the printing plate (RPL) is also transcribed to the glass substrate of the LCD device. Therefore, the alignment film has the unwanted dragging trace so that a strain in horizontal direction may be shown when the display is operating.

Figure 4:
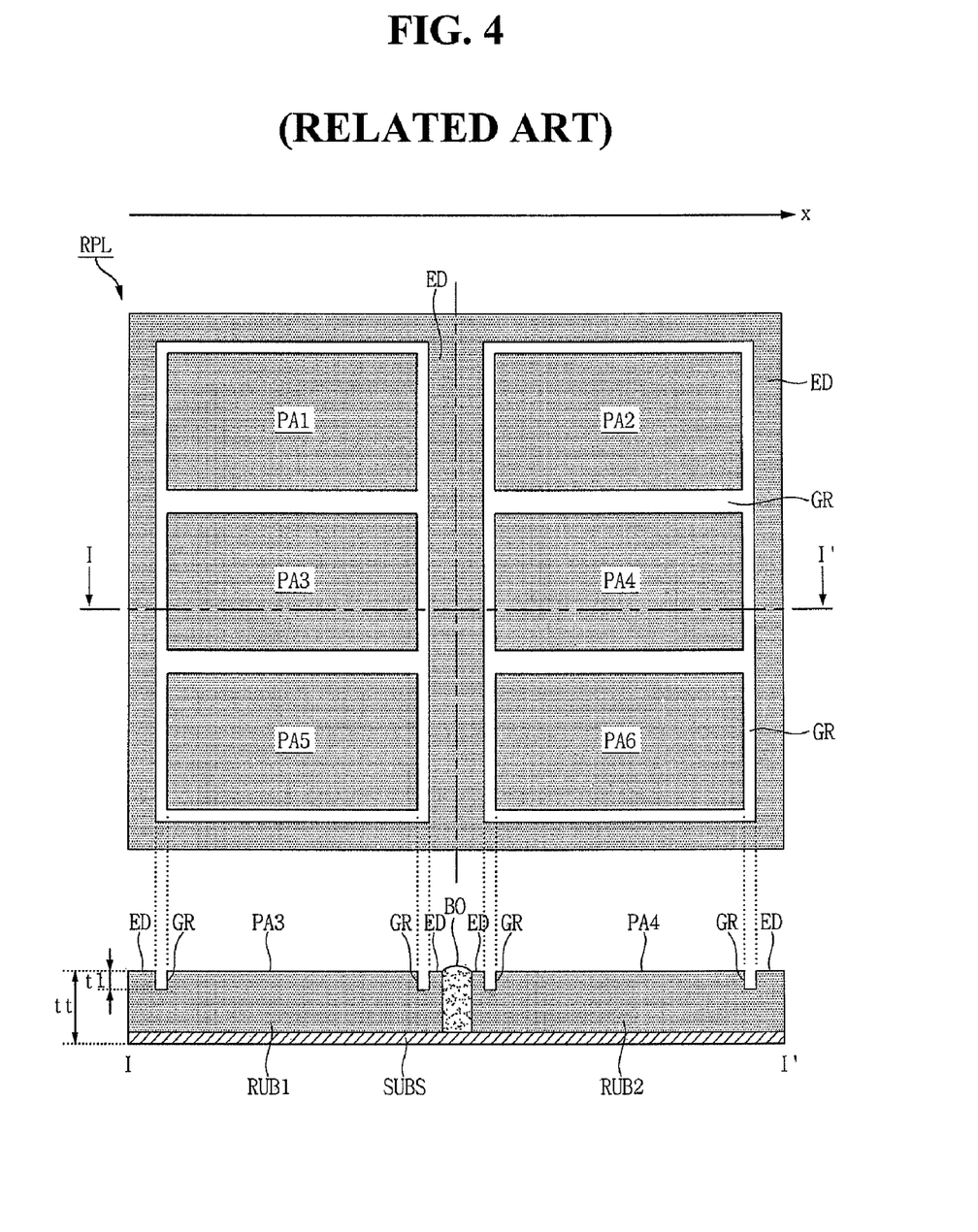
FIG. 4 is a cross sectional view cutting along with line I-I' for illustrating the structure of the printing plate shown in FIG. 2 in detail.

FIG. 4 illustrates one embodiment of the printing plate applied to the method of obtaining a multi-panel by cutting a single glass.

Referring to FIG. 4, the printing plate (RPL) includes a base film (SUBS) and a first and a second resin plates (RUB1 and RUB2) formed on the base film (SUBS). The base film (SUBS) is made of PET ("poly ethylene terephthalate"). The first and the second resin plates (RUB1 and RUB2) are parallelly attached on the base film (SUBS) a predetermined distance apart from each other. Furthermore, the sides of the resin plate (RUB1 and RUB2) facing each other are adhered by adhesives (BO).

On each of resin plates (RUB1 and RUB2), embossing patterns (or "ED") PA1 to PA6, and grooved patterns (GR) are formed. The embossing patterns include a dummy embossing pattern (ED) formed in closed loop shape along with 4 edges and pixel array embossing patterns PA1 to PA6 corresponding to the pixel array of the LCD device. To the embossing patterns, the alignment film material 23 is transcribed from the anilox roller 22. The grooved patterns is formed between the neighboring embossing patterns PA1 and PA6, and between the pixel array embossing pattern PA1 to PA6 and the dummy embossing pattern (ED) with having a predetermined depth (t1). The depth (t1) of the grooved patterns (GR) is less than the printing plate (RPL) thickness (tt).

Figure 5:
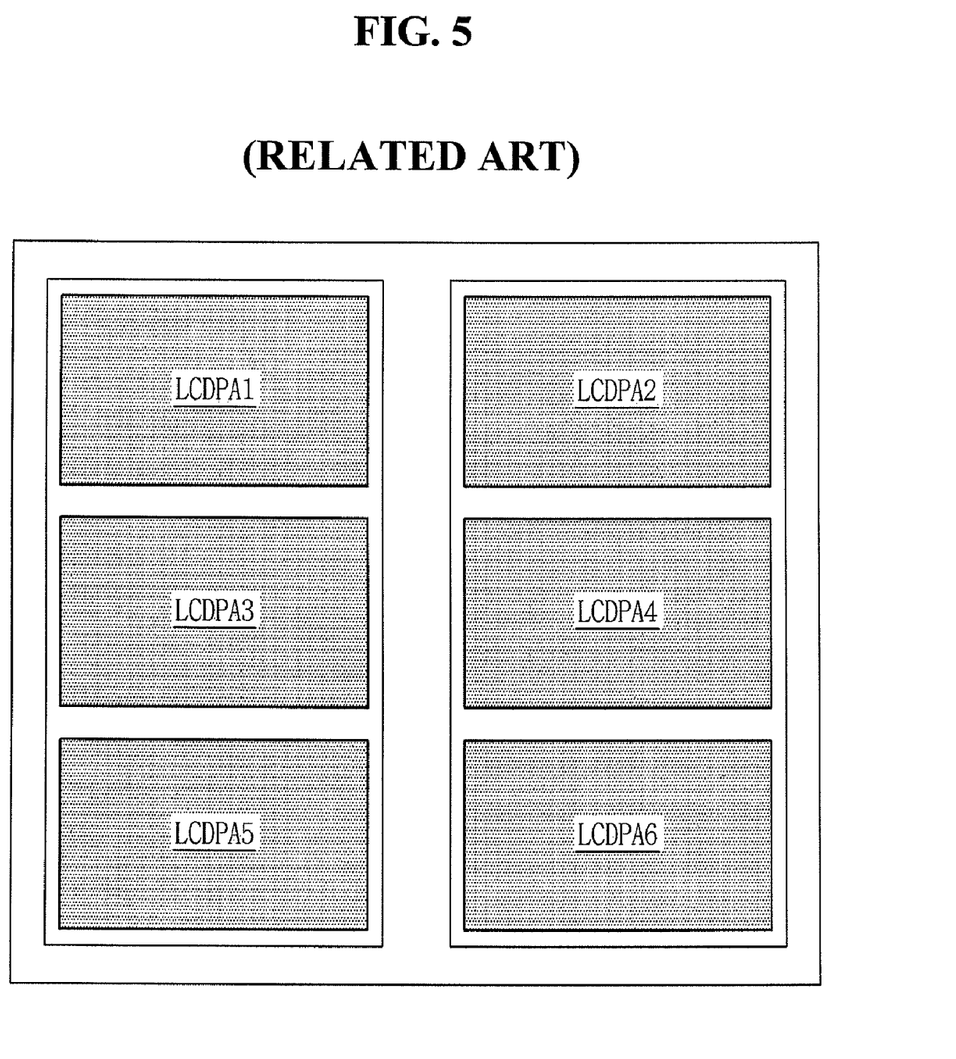
FIG. 5 is a plane view illustrating a mother glass substrate of the liquid crystal display device on which an alignment film is printed by the printing plate shown in FIG. 4.

In the method of obtaining a multi-panel by cutting a single glass, a plurality of pixel arrays (LCDPA1 to LCDPA6) are on one large mother glass substrate (GLSM) as shown in FIG. 5. In FIG. 4, the pixel array embossing patterns (PA1 to PA6) formed on the resin plates (RUB1 and RUB2) transcribe the alignment film material to the pixel arrays (LCDPA1 to LCDPA6) formed on the large mother glass substrate (GLSM) of LCD device shown in FIG. 5. The pixel arrays of the mother glass substrate (GLSM) include TFT array or color filter array.

In the printing plate (RPL) of the FIG. 4, the dummy embossing patterns (ED) and the pixel array embossing patterns (PA1 to PA6) are overlayed along with the forwarding direction or rotating direction (x) of the printing roller 21 against the glass substrate 20 of the LCD device so that the strain such as the dragging trace of the doctor roller 26 due to the dummy embossing pattern (ED) is also transcribed to the alignment film material on the pixel array embossing patterns (PA1 to PA6). In the interim, when an impact force is applied to the anilox roller 22 due to the level difference between the upper surface of the resin plates (RUB1 and RUB2) and the upper surface of the adhesive (BO), the pressing force of the doctor roller 26 to the anilox roller 22 is varied and the gap between the anilox roller 22 and the doctor blade 24 is uneven so that the strain may be transcribed to the alignment film material on the printing plate (RPL). The strain transcribed to the alignment film material on the anilox roller 22 is still remained at the next rotation, so that the strain may be transcribed to the pixel array embossing patterns (PA1 to PA6) of the printing plate (RPL) periodically in certain time interval.

BRIEF SUMMARY

According to one embodiment of the present disclosure a printing plate comprises: a resin plate; a plurality of pixel array embossing patterns formed on the resin plate, for printing the alignment film to a pixel array formed on the glass substrate of the liquid crystal display device; a plurality of dummy embossing patterns formed on the resin plate at which the pixel array embossing patterns are not formed as seen in the rotating direction of the printing roller; and a grooved pattern formed on the resin plate between the pixel array embossing patterns and between the dummy embossing patterns.

The printing plate according to another embodiment of the present disclosure comprises: a resin plate; a pixel array embossing pattern formed on the resin plate, for printing the alignment film to a pixel array formed on the glass substrate of the liquid crystal display device; and a grooved pattern formed on the resin plate between the pixel array embossing pattern and an end side of the resin plate.

The printing method according to one embodiment of the present disclosure comprises: preparing the printing plate including a plurality of pixel array embossing patterns formed on the resin plate, for printing the alignment film to a pixel array formed on the glass substrate of the liquid crystal display device, a plurality of dummy embossing patterns formed on the resin plate at which the pixel array embossing patterns are not formed as seeing in the rotating direction of the printing roller, and a grooved pattern formed on the resin plate between the pixel array embossing patterns and between the dummy embossing patterns; winding the printing plate around the printing roller, coating the alignment film material on the anilox roller, and transcribing the alignment film material to the printing plate by rotating the anilox roller and the printing roller; and rotating the printing roller on the substrate of the liquid crystal display device and moving the printing roller to a direction across the substrate of the liquid crystal display device to transcribe the alignment film material coated on the embossing patterns of the printing plate onto the substrate of the liquid crystal display device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

The manufacturing method for the liquid crystal display device according to the embodiment of the present disclosure comprises cleaning the substrates, patterning the substrates, printing and rubbing the alignment film, joining the substrates and dropping liquid crystal material, mounting panel, inspecting panel, assembling module and so on. The step of cleaning the substrate is for removing the foreign materials contaminating the surface of the substrate of the liquid crystal display device with a cleaning agent.

The step of patterning substrate includes the steps of patterning the layers formed on the upper glass substrate (GLSU) and the steps of patterning the layers formed on the lower substrate (GLSL).

The step of printing and rubbing the alignment film includes the step of printing the alignment film on the glass substrate using the alignment film printing device shown in FIG. 2 or FIG. 3, and the step of rubbing the alignment film with the rubbing clothes or processing light alignment to the alignment film. On the printing plate winding around the printing roller of the alignment film printing device, as mentioned below, dummy embossing patterns are not overlayed with and not connected to the array embossing pattern, in the rotating direction of the printing roller.

In the steps of joining the substrates and dropping liquid crystal material, the sealant (SL) is drawn on any one of upper and lower glass substrates (GLSU and GLSL) and the liquid crystal material is dropped on the other glass substrate. For example, after that the sealant (SL) is formed on the upper glass substrate (GLSU) and the liquid crystal (LC) material is dropped on the lower glass substrate (GLSL), the upper glass substrate (GLSU) having the sealant is turn over and fixed by the upper stage, and then the lower glass substrate (GLSL) having liquid crystal (LC) material is fixed by the lower stage. The sealant may be selected from one of a thermosetting sealant and a UV (or "ultraviolet") light setting sealant. After aligning the upper glass substrate (GLSU) with the lower glass substrate (GLSL), the vacuum force is applied to one of the stages by operating the vacuum pump so as to join the upper and lower glass substrates (GLSU and GLSL). At this time, the cell gap of the liquid crystal (LC) layer is larger than the designed cell gap. By injecting nitrogen gas (N2) to adjust to the atmospheric pressure, the cell gap will be satisfied with the degined cell gap by the pressure difference between the inner side and outer side of the joined glass substrates (GLSU and GLSL). After that, for example, in the case that the light setting sealant is selected, a UV light is irradiated to the sealant through the upper stage (STGU) and the upper glass substrate (GLSU) to harden the sealant. The steps of joining the substrates and dropping liquid crystal material is explained in Korean patent application KR 10-2007-0111040 filed by the applicant of this disclosure, in detail.

The step of mounting panel uses the TAB (or "Tape Automated Bonding") process or the COG (or "Chip On Glass") process. The step of inspecting includes the inspecting the integrated circuit (or "IC"), inspecting the signal wirings such as the data line and gate line formed on the lower glass substrate (GLSL), inspecting panel after forming pixel electrodes, and inspecting panel after joining substrates and dropping liquid crystal material. The step of repairing is to recover the signal lines or TFT which are decided as to be possible to repair.

The step of assembling module is for assembling the liquid crystal display panel and the backlight unit.

The printing plate and the alignment film printing method using the printing plate according to the embodiment of the present disclosure can be applied to any kinds of the alignment printing processes for the liquid crystal display device.

Figure 6:
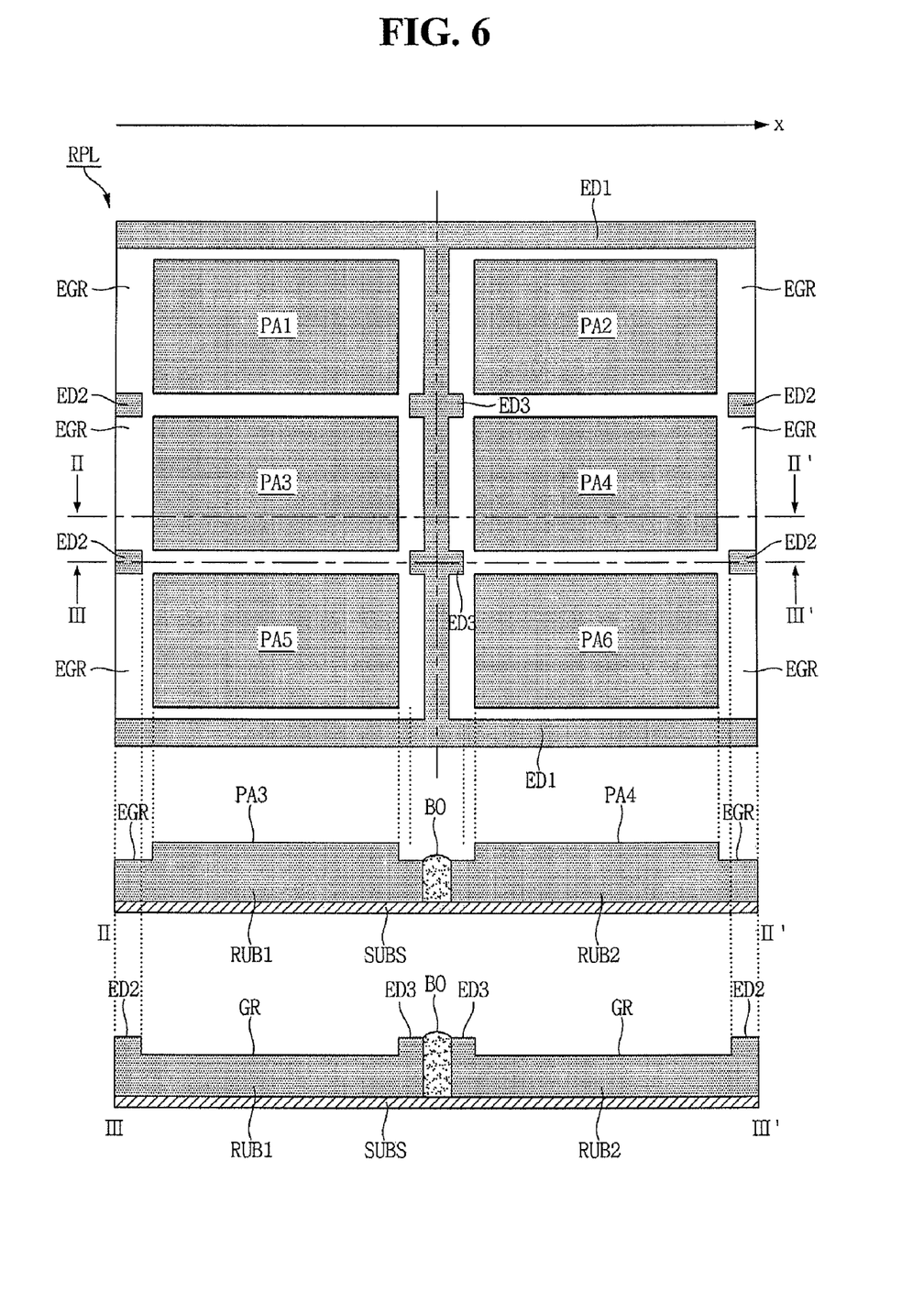
FIG. 6 illustrates a plane view, a cross sectional view cutting along with line II-II', and a cross section view cutting along with line III-III' for showing the structure of the printing plate according to the first embodiment of the present disclosure.
Figure 7:
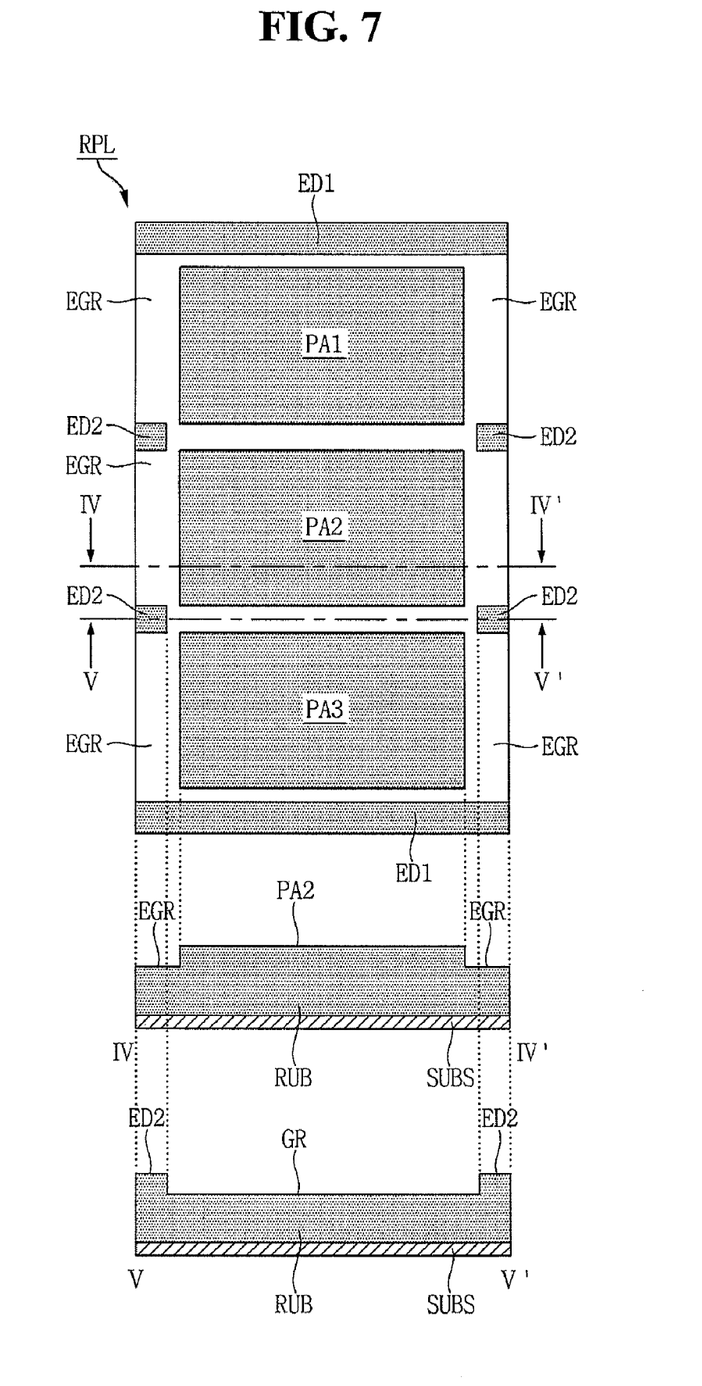
FIG. 7 illustrates a plane view, a cross sectional view cutting along with line IV-IV', and a cross section view cutting along with line V-V' for showing the structure of the printing plate according to the second embodiment of the present disclosure.
Figure 8:
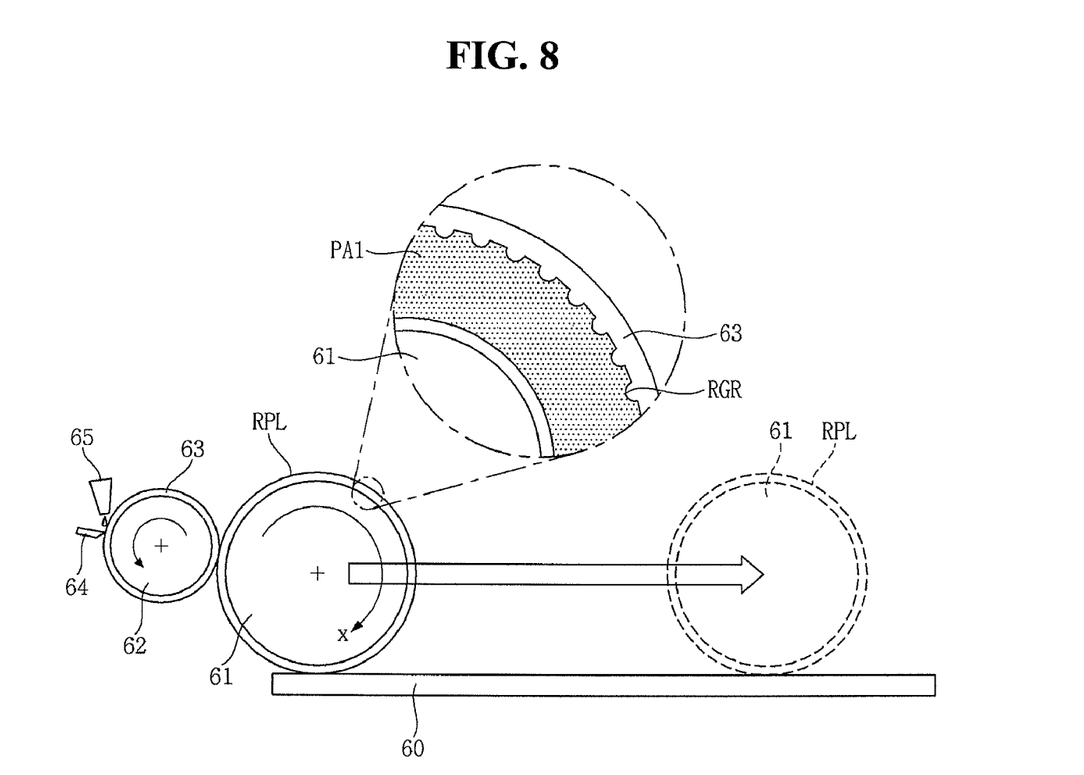
FIG. 8 is a cross sectional view illustrating the alignment film printing device according to the embodiment of the present disclosure.

Referring to FIGS. 6 to 8, the preferred embodiment for the printing plate used for the alignment film printing process and the alignment film printing method will be explained.

FIG. 6 illustrates the printing plate (RPL) according to the first embodiment of the present disclosure.

Referring to FIG. 6, the printing plate (RPL) according to the first embodiment of the present disclosure includes the base film (SUBS) and the first and the second resin plates (RUB 1 and RUB2) formed on the base film (SUBS). The base film (SUBS) may be made of PET.

When attaching the printing plate (RPL) on the printing roller, the surface of the base film which is the rear side of the surface attached to the resin plate is attached to the printing roller. The first and the second resin plate (RUB1 and RUB2) are parallelly attached on the base film (SUBS) with a predetermined gap. The facing sides of the resin plates (RUB1 and RUB2) acrossing the gap are bonded by an adhesive (BO). As shown in FIG. 6, the two resin plates may be attached on the base film in parallel. As shown in FIG. 7, one resin plate may be formed on the base film. Otherwise, three or more resin plates may be attached on the base film in parallel.

Each of resin plates (RUB1 and RUB2) includes the embossing patterns ED1, ED2, ED2, PA1 to PA6 and the grooved patterns EGR and GR. The resin plates (RUB1 and RUB2) may be mainly made of unsaturated resin such as polyburadine group. In order to reduce the processing numbers in the manufacturing process and to make the patterning process be easy, they may be made of the photosensitive resin.

The embossing patterns includes the first dummy embossing pattern ED1 formed at the upper and lower edges of the printing plate (RPL), a plurality of the second dummy embossing pattern ED2 formed at both sides edge of the printing plate (RPL), a plurality of the third dummy embossing pattern ED3 formed at the center of the printing plate (RPL), and a plurality of pixel array embossing patterns PA1 to PA6. The first dummy embossing pattern ED1 is formed in the linear pattern parallel to the rotating direction (x) of the printing roller so that it is not overlayed with the pixel array embossing patterns PA1 to PA6 along to the rotating direction (x) of the printing roller. The second dummy embossing patterns ED2 are formed in the island pattern at the both sides of the printing plate (RPL) so that they are not overlayed with the pixel array embossing patterns PA1 to PA6 along to the rotating direction (x) of the printing roller. The third dummy embossing patterns ED3 are formed in the island pattern on the center portion of the printing plate (RPL), that is, near the attaching surface of the resin plates so that they are not overlayed with the pixel array embossing patterns PA1 to PA6 along to the rotating direction (x) of the printing roller. In the figure, the second and the third dummy embossing patterns ED2 and ED3 have the rectangular shape. However, the shape of the embossing patterns is not restricted to that but they may have triangular or circular shape.

Therefore, all dummy embossing patterns ED1, EP2 and ED3 are not overlayed with the pixel array embossing patterns PA1 to PA6 along to the rotating direction (x) of the printing roller. When the pressing force of the doctor roller to the anilox roller is varied or the gap between the anilox roller and the doctor blade is uneven due to the dummy embossing patterns ED1, EP2 and ED3 so that the alignment film material on the anilox roller has stains, the stains are formed only on the portion which can not affect to the pixel array embossing patterns PA1 to PA6. As a result, the stain occurred on the anilox roller is not transcribed to the pixel array embossing patterns PA1 to PA6 of the printing plate at next rotation of the anilox roller. As the pixel array embossing patterns PA1 to PA6 are the embossing patterns having the size and shape corresponding to the pixel array formed on the mother glass substrate of the liquid crystal display device, they transcribes the alignment film material to the mother glass substrate. The alignment film material supplied from the anilox roller of the alignment film printing device shown in FIG. 2 or FIG. 8 is coated on the each embossing patterns ED1, ED2, ED3 and PA1 to PA6. On the surface of each embossing patterns ED1, ED2, ED3 and PA1 to PA6, there are pimple pattern including grooves (RGR) as shown in FIG. 8 to hold the alignment film material safely.

In the interim, if the second and third dummy patterns ED2 and ED3 are not formed on the printing plate (RPL), following problems may be occurred. As mentioned above, while the printing roller of the alignment film printing device is rotating and moving forward, the glass substrate of the liquid crystal display device is attached on the stage by vacuum force. In this case, if the second and third dummy patterns ED2 and ED3 are not formed on the printing plate (RPL), the glass substrate may be broken. In detail, as the rubber is easily attached on the glass, if the dummy patterns ED2 and ED3 are not formed on the printing plate (RPL), the glass substrate of the liquid crystal display device contact the rubber of the printing plate directly. As the printing plate (RPL) is rotating with the printing roller, the edge of the glass substrate of the liquid crystal display device attached to the rubber is lifted up. Therefore, by the force applied to the edge of the glass substrate attached to the rubber and the force applied to the other portions of the glass substrate, the glass may be broken. That is, as the glass substrate of the liquid crystal display device is attached to the stage by the vacuum force, while one end portion of the glass substrate is lifted up by attaching force of rubber of printing roller, the glass substrate between the fixed portion by vacuum force and the lifted portion may be broken. However, as the alignment film material is coated on the second and the third dummy patterns ED2 and ED3, the dummy patterns ED2 and ED3 prevent the glass substrate from contacting the rubber of the printing plate (RPL) directly so that the glass substrate is not attached to the printing plate (RPL).

The grooved patterns EGR and GR include the expanding grooved patterns EGR formed in vertical direction at the both sides and the central portion, and the grooved patterns GR formed in horizontal direction at the between the pixel embossing patterns PA1 to PA6. Each of the expanding grooved patterns EGR is expanded wider than a conventional pattern at both sides of the pixel array embossing patterns PA1 to PA6, because there is no dummy embossing pattern at both sides of the pixel array embossing patterns PA1 to PA6. In other words, in the expanding grooved patterns EGR formed at the both ends of the resin plates RUB1 and RUB2 and between the pixel array embossing patterns PA1 to PA6, there is no embossing pattern. The width of the expanding grooved patterns EGR formed at the left edge of the printing plate (RPL) is same with the width between the left edge of the pixel array embossing patterns (PA1, PA3 and PA5) and the left edge of the printing plate (RPL). The width of the expanding grooved patterns EGR formed at the right edge of the printing plate (RPL) is same with the width between the right edge of the pixel array embossing patterns (PA2, PA4 and PA6) and the right edge of the printing plate (RPL). The width of the expanding grooved pattern EGR formed at the central portion of the printing plate (RPL) is the same with the width between the right edge of the left column pixel array embossing patterns (PA1, PA3 and PA5) and the left edge of the right column pixel array embossing patterns (PA2, PA4 and PA6).

The adhesive (BO) for bonding the first and the second resin plates RUB1 and RUB2 is positioned in the expanding grooved pattern EGR formed at the central portion of the printing plate (RPL). Therefore, the height of the adhesive (BO) positioned between the left column pixel array embossing patterns (PA1, PA3 and PA5) and the right column pixel array embossing patterns (PA2, PA4 and PA6) is lower than the height of the pixel array embossing patterns PA1 to PA6, so that the upper surface of the adhesive (BO) positioned between the pixel array embossing patterns is not contacted the anilox roller.

The grooved patterns (GR) between pixel arrays include the grooved pattern formed at between the left column pixel array embossing patterns (PA1, PA3 and PA5) and at between the right column pixel array patterns (PA2, PA4 and PA6), and the grooved pattern formed between the uppermost pixel array embossing patterns (PA1 and PA2) and the upper first dummy embossing pattern ED1, and the grooved pattern formed between the lowermost pixel array embossing patterns (PA5 and PA6) and the lower first dummy embossing pattern ED1.

FIG. 7 illustrates the printing plate (RPL) according to the second embodiment of the present disclosure. The printing plate of the second embodiment includes one resin plate.

Referring to FIG. 7, the printing plate (RPL) according to the second embodiment of the present disclosure includes the base film (SUBS) and the resin plate (RUB) formed on the base film (SUBS).

The base film (SUBS) may be made of PET. When attaching the printing plate (RPL) on the printing roller, the surface of the base film at the rear side of the attached face of the resin plate is attached to the printing roller.

On the resin plates (RUB), the embossing patterns ED1, ED2 and PA1 to PA3 and the grooved patterns EGR and GR are formed.

The embossing patterns include the first dummy embossing pattern ED1 formed at the edge of the upper and lower ends of the printing plate (RPL), a plurality of the second dummy pattern ED2 formed at the both end sides of the printing plate (RPL), and a plurality of the pixel array embossing patterns PA1 to PA3. The first dummy embossing pattern ED1 is formed in a linear pattern parallel to the rotating direction (x) of the printing roller so that the first dummy embossing pattern ED1 is not overlapped with the pixel array embossing patterns PA1 to PA6 as seeing in rotating direction (x) of the printing roller. The second dummy embossing patterns ED2 are formed in the island pattern at both end sides of the printing plate (RPL) so as not to be overlapped with the pixel array embossing patterns PA1 to PA3. The second dummy embossing pattern ED2 is formed in rectangular pattern, but it is not restricted to that. For example, it may have a triangular or circular shape.

All of dummy embossing patterns ED1 and ED2 are not overlapped with the pixel array embossing patterns PA1 to PA3 as seeing at the rotating direction (x) of the printing roller. Therefore, when the alignment film material on the anilox roller has strains because the pressing force of the doctor roller to the anilox roller is varied or the gap between the anilox roller and doctor blade is uneven due to the dummy embossing patterns ED1 and ED2, the strains are positioned only where the strains do not affect to the pixel array embossing patterns PA1 to PA3. As a result, the strains of the anilox roller are not transcribed to the pixel array embossing patterns PA1 to PA3 at the next turn of the anilox roller. The pixel array embossing patterns PA1 to PA3 have the shape and size corresponding to each of the pixel arrays and transcribe the alignment film material to the mother glass substrate. At each of embossing patterns ED1, ED2 and PA1 to PA3, the alignment film material supplied from the anilox roller of the alignment film printing device shown in FIG. 2 or FIG. 8 is coated. On each surface of the embossing patterns ED1, ED2 and PA1 to PA3, tiny pimple patterns are formed to hold the alignment film material in stable.

As mentioned above, if there is no second dummy pattern ED2 on the printing plate (RPL), the rubber of the printing plate (RPL) is directly contact the glass substrate and is lifted up so that the glass substrate of the liquid crystal display device may be broken.

The grooved patterns EGR and GR include the expanding grooved patterns EGR formed in vertical direction at the both sides, and the grooved patterns GR formed in horizontal direction at the between the pixel embossing patterns PA1 to PA3. Each of the expanding grooved patterns EGR is expanded wider than conventional pattern at both sides of the pixel array embossing patterns PA1 to PA3, because there is no dummy embossing pattern at both sides of the pixel array embossing patterns PA1 to PA3. The width of the expanding grooved patterns EGR formed at the left edge of the printing plate (RPL) is same with the width between the left edge of the pixel array embossing patterns PA1 to PA3 and the left edge of the printing plate (RPL). The width of the expanding grooved patterns EGR formed at the right edge of the printing plate (RPL) is same with the width between the right edge of the pixel array embossing patterns PA1 to PA3 and the right edge of the printing plate (RPL). The grooved patterns GR between the pixel arrays include the grooved patterns formed between the pixel array embossing patterns PA1 to PA3, the grooved pattern formed between the uppermost end pixel array embossing pattern PA1 and the upper first dummy embossing pattern ED1, and the grooved patterns formed between the lowermost pixel array embossing patterns PA3 and the lower first dummy embossing pattern ED1.

As mentioned above, in the printing plate (RPL) according to the embodiments of the present disclosure, the pixel array embossing patterns are not overlapped with the dummy embossing patterns as seeing in the rotating direction (x) of the printing roller, so that the alignment film material on the anilox roller has no strain or unwanted pattern. Therefore, the printing device according to the embodiments of the present disclosure can make the thickness of the alignment film material coated on the anilox roller be uniform with just doctor blade only as shown in FIG. 8, in which the doctor roller 26 is removed from the printing device shown in FIG. 2. Furthermore, in the printing device according to the embodiments of the present disclosure, the alignment film material coated on the anilox roller does not have any strain or unwanted pattern, and the thickness of the alignment film can be uniformly formed. As a result, the rotating speed of rollers can be increased compared to conventional devices so that the processing lap time can be reduced compared to a conventional one.

Referring to FIG. 8, the alignment film printing device according to the embodiments of the present disclosure includes the printing roller 61 wound by the printing plate (RPL), the anilox roller 62, the doctor blade 64, and the dispenser 65.

The printing roller 61 contacts the anilox roller 62 to be supplied the alignment film material 63 from the anilox roller 62. For the alignment film material 63, the polyimide may be selected. A pinion gear is engaged to one side of the printing roller 61. The pinion gear is engaged to the rack gear again. The printing roller 61 is rotated by interlocking with the pinion and rack gears and moves linearly along the linear arrow line crossing the glass substrate 60 of the liquid crystal display device to transcribe the alignment film material 63 coated on the printing plate (RPL) on to the glass substrate 60 of the liquid crystal display device. While the printing roller 61 transcribes the alignment film material on to the glass substrate 60 of the LCD device, the glass substrate 60 is attached to the stage by vacuum force.

The alignment film material 63 is supplied from the dispenser 62 to the anilox roller 62. As the anilox roller 62 and the printing roller 61 are rotated in opposite directions to each other, the alignment film material 63 coated on the anilox roller 62 is transcribes to the printing roller 61.

The doctor blade 64 shaves off the alignment film material 63 supplied to the anilox roller 62 from the dispenser 65 to make the thickness of the alignment film coated on the anilox roller 62 uniform and remove the strain or unwanted pattern.

As mentioned above, the printing plate and the alignment film printing method using the printing plate according to the embodiments of the present disclosure remove the dummy embossing pattern from the both sides of the pixel array embossing pattern formed on the printing plate as seen in the rotating direction of the printing roller, so that the strains caused on the alignment film material by the level difference of the dummy patterns is minimized. Furthermore, it is possible to prevent the strain or unwanted pattern from being transcribed to the pixel array embedding patterns. The printing plate and the alignment film printing method using the printing plate according to the embodiment of the present disclosure form the dummy embossing pattern at which the pixel array embossing patterns are not overlapped with the dummy embossing patterns as seeing in rotating direction of the printing roller in order that the rubber of the printing plate does not directly contact the glass substrate. Therefore, it is possible to prevent glass damage due to the adhesion between the rubber and glass substrate in the alignment film printing process.

While the embodiment of the present invention has been described in detail with reference to the drawings, it will be understood by those skilled in the art that the invention can be implemented in other specific forms without changing the technical spirit or essential features of the invention. The scope of the invention is defined by the appended claims rather than the detailed description of the invention. All changes or modifications or their equivalents made within the meanings and scope of the claims should be construed as falling within the scope of the invention.

The invention claimed is:

1. A printing plate wound around a printing roller for transcribing an alignment film material to a glass substrate of a liquid crystal display device comprising:
   a resin plate;
   a plurality of pixel array embossing pattern formed on the resin plate, for printing the alignment film to a pixel array formed on the glass substrate of the liquid crystal display device;
   a plurality of dummy embossing pattern formed on the resin plate at which the pixel array embossing patterns are not formed as seeing in the rotating direction of the printing roller; and
   a grooved pattern formed on the resin plate between the pixel array embossing patterns and between the dummy embossing patterns.

2. The printing plate of the claim 1, wherein the resin plate includes two or more resin plates.

3. The printing plate of the claim 1, further comprising:
   a base film attached to the resin plate; and
   an adhesive bonding sides facing each other on the resin plate.

4. The printing plate of the claim 1, wherein the dummy embossing patterns are formed at which they are not overlapped with the pixel array embossing pattern as seeing in the rotating direction of the printing roller, on the resin plate.

5. The printing plate of the claim 4, wherein there is no embossing pattern among the grooved patterns formed between an end of the resin plate and the pixel array embossing pattern.

6. A printing plate wound around a printing roller for transcribing an alignment film material to a glass substrate of a liquid crystal display device comprising:
   a resin plate;
   a pixel array embossing pattern formed on the resin plate, for printing the alignment film to a pixel array formed on the glass substrate of the liquid crystal display device;
   a grooved pattern formed on the resin plate between the pixel array embossing pattern and an end side of the resin plate: and a dummy embossing pattern formed on the resin plate at which the pixel array embossing pattern is not formed as seeing in the rotating direction of the printing roller.

7. The printing plate of the claim 6, wherein the resin plate includes two or more resin plates.

8. The printing plate of the claim 6, further comprising:
a base film attached to the resin plate; and
an adhesive bonding sides facing each other on the resin plate.

9. An alignment film printing method using a printing plate wound around a printing roller for transcribing an alignment film material supplied by an anilox roller onto a glass substrate of a liquid crystal display device comprising:
preparing the printing plate including a plurality of pixel array embossing pattern formed on the resin plate, for printing the alignment film to a pixel array formed on the glass substrate of the liquid crystal display device, a plurality of dummy embossing pattern formed on the resin plate at which the pixel array embossing patterns are not formed as seeing in the rotating direction of the printing roller, and a grooved pattern formed on the resin plate between the pixel array embossing patterns and between the dummy embossing patterns;
winding the printing plate around the printing roller, coating the alignment film material on the anilox roller, and transcribing the alignment film material to the printing plate by rotating the anilox roller and the printing roller; and
rotating the printing roller on the substrate of the liquid crystal display device and moving the printing roller to a direction across the substrate of the liquid crystal display device to transcribe the alignment film material coated on the embossing patterns of the printing plate onto the substrate of the liquid crystal display device.

10. The method of the claim 9, wherein two or more resins are attached on the base film of the printing plate, and an adhesive is filled between sides facing each other on the resin plate.

11. The method of the claim 9, wherein the dummy embossing patterns are formed at which they are not overlapped with the pixel array embossing pattern as seeing in the rotating direction of the printing roller, on the resin plate.

12. The method of the claim 11, wherein there is no embossing pattern among the grooved patterns formed between an end of the resin plate and the pixel array embossing pattern.

13. The method of the claim 9, further comprising:
installing a doctor blade so as to face with the anilox roller with predetermined gap to make thickness of the alignment film material coated on the anilox roller be uniformly by the doctor blade only.

* * * * *